United States Patent
Carey

(10) Patent No.: US 11,756,367 B2
(45) Date of Patent: *Sep. 12, 2023

(54) INVESTIGATION GENERATION IN AN OBSERVATION AND SURVEILLANCE SYSTEM

(71) Applicant: James Carey, Commack, NY (US)

(72) Inventor: James Carey, Commack, NY (US)

(*) Notice: Subject to any disclaimer, the term of this patent is extended or adjusted under 35 U.S.C. 154(b) by 275 days.

This patent is subject to a terminal disclaimer.

(21) Appl. No.: 17/101,337

(22) Filed: Nov. 23, 2020

(65) Prior Publication Data

US 2021/0074114 A1 Mar. 11, 2021

Related U.S. Application Data

(63) Continuation of application No. 16/458,846, filed on Jul. 1, 2019, now Pat. No. 10,846,971, which is a (Continued)

(51) Int. Cl.
*G08B 13/196* (2006.01)
*G06Q 20/20* (2012.01)
(Continued)

(52) U.S. Cl.
CPC ............ *G07F 9/026* (2013.01); *G06Q 20/20* (2013.01); *G07G 3/003* (2013.01); (Continued)

(58) Field of Classification Search
None
See application file for complete search history.

(56) References Cited

U.S. PATENT DOCUMENTS 6,975,346 B2 12/2005 Kumhyr
7,308,487 B1 12/2007 Dansie et al.
(Continued)

FOREIGN PATENT DOCUMENTS

RU 2309674 C2 11/2007
RU 83675 U1 6/2009
(Continued)

OTHER PUBLICATIONS

Canadian Office Action dated Sep. 2, 2021 issued in corresponding CA Appln. No. 3,091,605.
(Continued)

*Primary Examiner* — Tsung Yin Tsai
(74) *Attorney, Agent, or Firm* — Carter, DeLuca & Farrell LLP

(57) ABSTRACT

The present disclosure is directed to systems and methods for generating investigations of user behavior. In an example embodiment, the system includes a video camera configured to capture video of user activity, a video analytic module to perform real-time video processing of the captured video to generate non-video data from video, and a computer configured to receive the video and the non-video data from the video camera. The computer includes a video analytics module configured to analyze one of video and non-video data to identify occurrences of particular user behavior, and an investigation generation module configured to generate an investigation containing at least one video sequence of the particular user behavior. In some embodiments, the investigation is generated in near real time. The particular user behavior may be defined as an action, an inaction, a movement, a plurality of event occurrences, a temporal event and/or an externally-generated event.

18 Claims, 2 Drawing Sheets

Related U.S. Application Data continuation of application No. 15/729,135, filed on Oct. 10, 2017, now Pat. No. 10,347,070, which is a continuation of application No. 14/213,548, filed on Mar. 14, 2014, now Pat. No. 9,786,113.

(60) Provisional application No. 61/798,740, filed on Mar. 15, 2013.

(51) Int. Cl.
  *G06V 20/52* (2022.01)
  *G07F 9/02* (2006.01)
  *G07G 3/00* (2006.01)
  *H04N 7/18* (2006.01)

(52) U.S. Cl.
  CPC ....... *G08B 13/19613* (2013.01); *H04N 7/181* (2013.01); *G06V 20/52* (2022.01)

(56) References Cited

U.S. PATENT DOCUMENTS

| | | | |
|---|---|---|---|
| 7,613,322 B2 * | 11/2009 | Yin | G06T 7/246 |
| | | | 382/103 |
| 9,158,975 B2 * | 10/2015 | Lipton | G08B 13/1968 |
| 9,762,865 B2 | 9/2017 | Carey | |
| 9,786,113 B2 | 10/2017 | Carey | |
| 10,347,070 B2 | 7/2019 | Carey | |
| 2003/0095687 A1 | 5/2003 | Montgomery | |
| 2004/0130620 A1 | 7/2004 | Buehler et al. | |
| 2004/0161133 A1 | 8/2004 | Elazar et al. | |
| 2005/0146605 A1 * | 7/2005 | Lipton | G08B 13/19615 |
| | | | 375/E7.006 |
| 2005/0162515 A1 | 7/2005 | Venetianer | |
| 2005/0169367 A1 | 8/2005 | Venetianer | |
| 2006/0243798 A1 | 11/2006 | Kundu et al. | |
| 2006/0262958 A1 * | 11/2006 | Yin | G06T 7/254 |
| | | | 382/103 |
| 2007/0003141 A1 | 1/2007 | Rittscher et al. | |
| 2007/0013776 A1 | 1/2007 | Venetianer | |
| 2007/0057049 A9 * | 3/2007 | Kundu | G06V 20/52 |
| | | | 235/383 |
| 2007/0058040 A1 | 3/2007 | Zhang et al. | |
| 2007/0127774 A1 * | 6/2007 | Zhang | G08B 13/19602 |
| | | | 382/103 |
| 2007/0182818 A1 | 8/2007 | Buehler | |
| 2007/0297607 A1 | 12/2007 | Ogura et al. | |
| 2008/0018738 A1 * | 1/2008 | Lipton | G06V 20/52 |
| | | | 348/E7.087 |
| 2008/0106599 A1 | 5/2008 | Liu et al. | |
| 2008/0198231 A1 | 8/2008 | Ozdemir et al. | |
| 2008/0263610 A1 | 10/2008 | Murray et al. | |
| 2008/0303902 A1 | 12/2008 | Romer et al. | |
| 2009/0002155 A1 | 1/2009 | Ma et al. | |
| 2009/0033745 A1 | 2/2009 | Yeredor et al. | |
| 2009/0208054 A1 | 8/2009 | Angell | |
| 2009/0222388 A1 | 9/2009 | Hua et al. | |
| 2009/0222466 A1 | 9/2009 | Allison et al. | |
| 2010/0026802 A1 | 2/2010 | Titus et al. | |
| 2010/0079594 A1 | 4/2010 | Voglewede et al. | |
| 2010/0135643 A1 | 6/2010 | Fleming | |
| 2010/0182428 A1 | 7/2010 | Lu et al. | |
| 2010/0321183 A1 | 12/2010 | Donovan et al. | |
| 2011/0211070 A1 | 9/2011 | Shu et al. | |
| 2011/0219385 A1 | 9/2011 | Jacobson et al. | |
| 2012/0008836 A1 | 1/2012 | Bobbitt et al. | |
| 2012/0127314 A1 * | 5/2012 | Clements | G08B 13/246 |
| | | | 235/375 |
| 2012/0127316 A1 | 5/2012 | Kundu et al. | |
| 2012/0208592 A1 | 8/2012 | Davis et al. | |
| 2012/0221687 A1 | 8/2012 | Hunter et al. | |
| 2012/0229647 A1 | 9/2012 | Calman et al. | |
| 2012/0233032 A1 | 9/2012 | Calman et al. | |
| 2012/0233033 A1 * | 9/2012 | Calman | G06Q 20/3278 |
| | | | 348/143 |
| 2012/0262575 A1 | 10/2012 | Champagne et al. | |
| 2012/0311564 A1 | 12/2012 | Khalid | |
| 2012/0320199 A1 | 12/2012 | Kundu et al. | |
| 2012/0324061 A1 | 12/2012 | Parsons et al. | |
| 2012/0327241 A1 | 12/2012 | Howe | |
| 2013/0027561 A1 | 1/2013 | Lee et al. | |
| 2013/0041961 A1 | 2/2013 | Thrower, III et al. | |
| 2013/0182905 A1 | 7/2013 | Myers | |
| 2013/0223688 A1 | 8/2013 | Golan | |
| 2014/0267735 A1 | 9/2014 | Carey | |
| 2015/0279155 A1 * | 10/2015 | Chun | G06Q 20/4016 |
| | | | 463/25 |
| 2015/0341599 A1 | 11/2015 | Carey | |
| 2018/0165733 A1 | 6/2018 | Kundu et al. | |

FOREIGN PATENT DOCUMENTS

| | | | | |
|---|---|---|---|---|
| RU | 2459267 C2 | 8/2012 | | |
| RU | 124017 U1 | 1/2013 | | |
| WO | 2007139994 A2 | 12/2007 | | |
| WO | WO-2007139994 A2 * | 12/2007 | | G06Q 20/20 |
| WO | 2012051651 A1 | 4/2012 | | |
| WO | 2012102909 A1 | 8/2012 | | |
| WO | 2012151651 A1 | 11/2012 | | |
| WO | 2012170551 A2 | 12/2012 | | |
| WO | 2013030296 A1 | 3/2013 | | |
| WO | 2014155958 A1 | 10/2014 | | |

OTHER PUBLICATIONS

Russian Office Action dated Feb. 4, 2021 issued in coresponding RU Appln. No. 2017137406.

International Search Report for PCT/US14/28940 dated Aug. 27, 2014.

International Search Report for corresponding application No. EP 14 76 4242 dated Aug. 26, 2015.

Anonymous: "Configuration Backup Restore", Jun. 30, 2010 (Jun. 30, 2010), XP055127450, retrieved from the Internet: URL:https://downloads.avaya.com/css/P8/documents/100088380 [retrieved on Jul. 8, 2014].

Canadian Office Action dated Jan. 24, 2017 in corresponding Canadian Patent Application No. 2,861,652, 3 pages.

European Office Action issued in corresponding European Patent Application No. 14764242.5, 8 pages.

Song et al., "Real-Time Monitoring for Crowd Counting Using Video Surveillance and GIS," IEEE, 2nd International Conference on Remote Sensing, Environment and Transportation Engineering (RSETE), Jun. 1, 2012, 4 pages.

Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.

Extended European Search Report for corresponding application No. EP 14 76 4242 dated Aug. 26, 2015.

Daniel A. Vaquera et al., "Attribute-Based People Search," Chapter 14, Intellegent Video Surveillance: Systems and Technology, published Dec. 7, 2009, pp. 387-405.

European Office Action dated Feb. 9, 2017 in corresponding European Patent Application No. 14764242.5, 8 pages.

Russian Office Action dated Nov. 11, 2016 in corresponding Russian Patent Application No. 2015138958 including English translation, 14 pages.

Canadian Office Action dated Apr. 18, 2019 issued in corresponding CA Appln. No. 3,010,108.

Extended European Search Report dated Oct. 9, 2019 issued in corresponding EP Appln. No. 19192551.0-1217.

European Search Report dated Feb. 25, 2020 issued in corresponding EP Appln. No. 20152129.1.

Brazilian Office Action dated May 20, 2020 issued in corresponding BR Appln. No. 112015023693.6.

Extended European Search Report dated Feb. 25, 2020 issued in corresponding EP Appln. No. 20152129.1.

European Examination Report dated Dec. 21, 2021 issued in corresponding EP Appln. No. 20 152 129.1.

(56) References Cited

OTHER PUBLICATIONS

European Examination Report dated Aug. 19, 2021 issued in corresponding EP Appln. No. 19192551.0.
Office Action issued in corresponding Canadian Application No. 3,091,605 dated Apr. 11, 2023 (5 pages).

* cited by examiner

INVESTIGATION GENERATION IN AN OBSERVATION AND SURVEILLANCE SYSTEM

CROSS REFERENCE TO RELATED APPLICATION

This application is a continuation of U.S. patent application Ser. No. 16/458,846, filed on Jul. 1, 2019, now U.S. Pat. No. 10,846,971, which is a continuation application of U.S. patent application Ser. No. 15/729,135, filed on Oct. 10, 2017, now U.S. Pat. No. 10,347,070, which is a continuation application of U.S. patent application Ser. No. 14/213,548, filed on Mar. 14, 2014, now U.S. Pat. No. 9,786,113, which claims the benefit of and priority to U.S. Provisional Application Ser. No. 61/798,740, filed on Mar. 15, 2013. The disclosures of all of the foregoing applications are incorporated in their entirety by reference herein.

BACKGROUND

1. Technical Field

The following relates to video observation, surveillance and verification systems and methods of use. The specific application may work in conjunction with a system providing external data such as, for example, a point of sale (POS) transaction system that will be described herein, however, information may be provided from any external data system related to transactions in health care facilities, restaurants, and the like.

2. Background of Related Art

Companies are continually trying to identify specific user behavior in order to improve the throughput and efficiency of the company. For example, by understanding user behavior in the context of the retail industry, companies can both improve product sales and reduce product shrinkage. Focusing on the latter, employee theft is one of the largest components of retail inventory shrink. Therefore, companies are trying to understand user behavior in order to reduce and ultimately eliminate inventory shrinkage.

Companies have utilized various means to prevent employee shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Most procedures and technologies focus on identifying individual occurrences instead of understanding the underlying user behaviors that occur during these events. As such, companies are unable to address the underlying condition that allows individuals to commit theft.

SUMMARY

Embodiments described herein may be framed in the context of retail shrinkage, although the systems and methods described herein can be applied to other retail or service industries such as health care facilities, restaurants, and the like.

In one aspect, the present disclosure is directed to a system to generate real-time investigations of user behavior. In an example embodiment, the system includes a video camera configured to capture video of user activity, a video analytic module to perform real-time video processing of the captured video to generate non-video data from video, and a computer configured to receive the video and the non-video data from the video camera. The computer includes a video analytics module configured to analyze one of video and non-video data to identify occurrences of particular user behavior, and an investigation generation module configured to generate an investigation containing at least one video sequence of the particular user behavior. In some embodiments, the investigation is generated in near real time. The particular user behavior may be defined as an action, an inaction, a movement, a plurality of event occurrences, a temporal event and/or an externally-generated event.

In some embodiments, the investigation generation module assigns externally-generated data to the investigation. In some embodiments, the computer receives the externally-generated data from a POS system and the externally-generated data includes at least one POS transaction. In some embodiments, the particular user behavior may be defined by a model of the particular user behavior. In embodiments, the video analytics module includes a comparator module configured to compare the model of a particular user behavior and the non-video data.

In some embodiments, the investigation generation module is configured to simultaneously manage and populate a plurality of investigations.

In another aspect, the present disclosure is directed to a system to generate real-time investigations of user behavior. An example embodiment of the system includes a video camera configured to capture video of user activity, a video analytic module to perform real-time video processing of the captured video to generates non-video data from video, and a computer configured to receive the video and the non-video data from the video camera. The computer includes a video analytics module configured to analyze one of video and non-video data to identify occurrences of particular user behavior, and an investigation generation module configured to assign a video sequence related to the identified occurrence of particular user behavior to an investigation. In some embodiments, investigation is generated in near real time. In some embodiments, the investigation generation module assigns externally-generated data to the investigation. In some embodiments, the computer receives the externally-generated data from a POS system. The externally-generated data includes at least one POS transaction.

In some embodiments, the investigation generation module is configured to simultaneously manage and populate a plurality of investigations. In some embodiments, the particular user behavior is defined as at least one of an action, an inaction, a movement, a plurality of event occurrences, a temporal event and an externally-generated event. In some embodiments, the particular user behavior is defined by a model of the particular user behavior. The video analytics module includes a comparator module configured to compare the model of the particular user behavior and the non-video data.

In yet another aspect, the present disclosure is directed to a method of observing behavior. In an example embodiment, the method includes receiving video from a camera, and generating non-video data from the video. The non-video data includes non-video data related to user behavior. The method includes identifying a particular user behavior, identifying at least one occurrence of the particular user behavior within the video data, and generating an investigation related to the particular user behavior.

In some embodiments, the method includes defining the particular user behavior as at least one of an action, an inaction, a movement, a plurality of event occurrences, a temporal event, and an externally-generated event.

In still another aspect, the present disclosure is directed to non-transitory computer-readable medium comprising software for monitoring a point of sale (POS) transaction, which software, when executed by a computer system, causes the computer system to receive video from a camera, generate non-video data from the video identifying a particular user behavior, identify an occurrence of the particular user behavior contained within the non-video data, and generate an investigation related to the identified occurrence of the particular user behavior. In some embodiments, the investigation includes video of the occurrence of the particular user behavior contained within the non-video data. In some embodiments, the software causes the computer system to receive externally-generated POS transaction data from a POS systems that includes at a least one individual transaction. In some embodiments, the software causes the computer to identify the particular user behavior temporally related to the at least one individual transaction. In some embodiments, the software causes the computer to provide data related to the at least one individual transaction to the investigation. In some embodiments, the software causes the computer to define the particular user behavior as at least one of an action, an inaction, a movement, a plurality of event occurrences, a temporal event and an externally-generated event.

In a further aspect of the present disclosure, an example embodiment of a non-transitory computer-readable medium includes software for monitoring user behavior, which software, when executed by a computer system, causes the computer system to receive non-video data from a camera wherein the non-video data includes user behavioral information data, identify a particular user behavior, identify an occurrence of the particular user behavior within the non-video data, identify video of the identified occurrence of the particular user behavior, and generate an investigation related to the identified occurrence of the particular user behavior, the investigation including the identified video. In some embodiments, the software causes the computer to define the particular user behavior as at least one of an action, an inaction, a movement, a plurality of event occurrences and a temporal event and an externally-generated event. In some embodiments, the particular user behavior is defined by a model of the particular user behavior. The occurrence identification step includes comparing the model of the particular user behavior to the non-video data. In some embodiments, the software causes the computer to receive externally-generated data from a POS system, wherein the externally-generated data includes at least one POS transaction, and identify an occurrence of the particular user behavior within the non-video data related to the at least one POS transaction. In some embodiments, the software causes the computer to provide data related to the at least one POS in the investigation.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan/tilt/zoom (PTZ) camera; and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non visual information extracted from the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION

Figure 1:
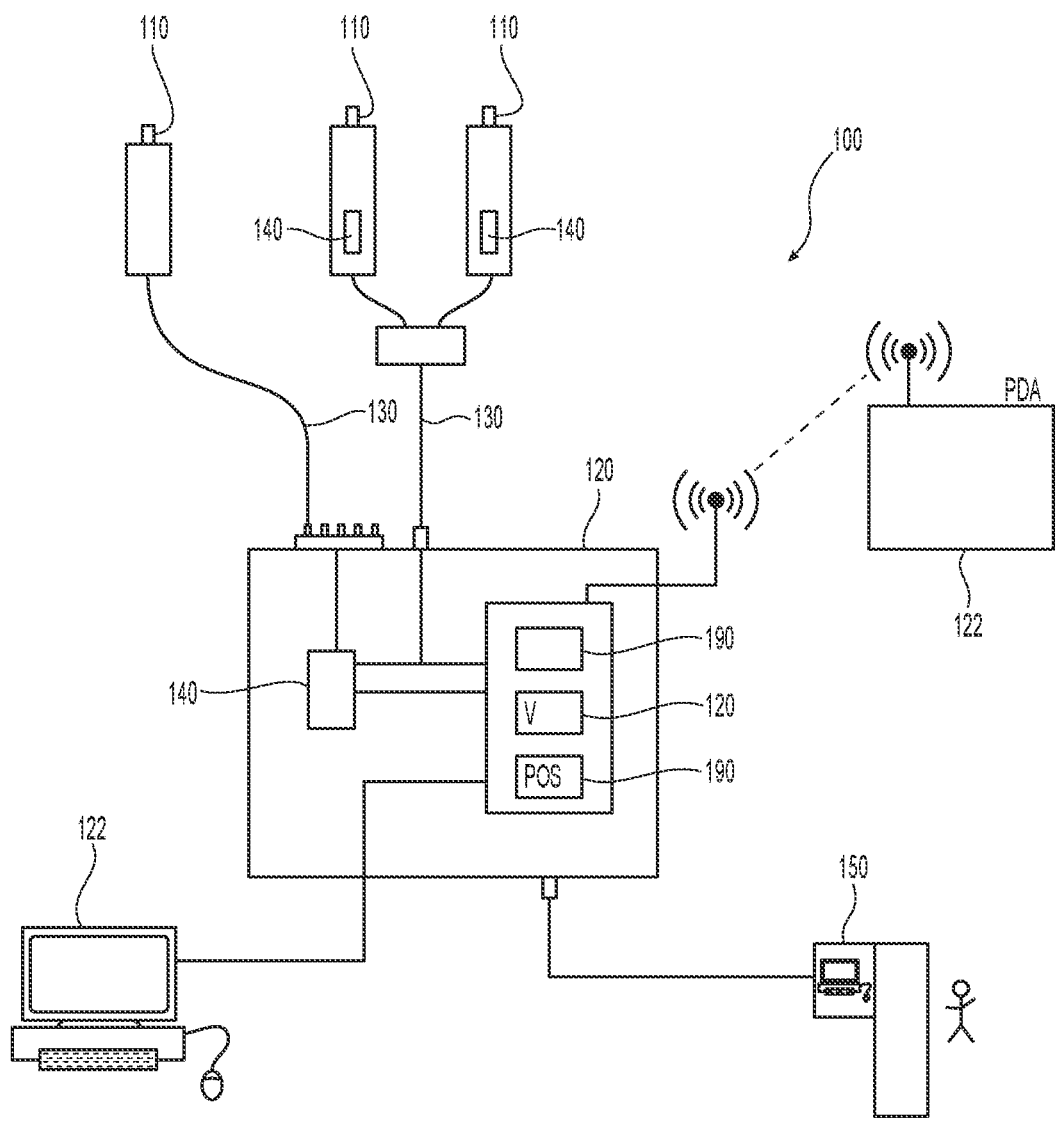
FIG. 1 is a system block diagram of an embodiment of a video observation, surveillance and verification system in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, linux, and/or Android®.

Further, it should be noted that embodiments of the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, embodiments of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

Embodiments of the present disclosure are described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

With reference to FIG. 1, a video observation, surveillance and verification system according to an embodiment of this disclosure is shown as 100. System 100 is a network video recorder that includes the ability to record video from one or more cameras 110 (e.g. analog and/or IP camera). System 110 includes one or more video cameras 110 that connect to a computer 120 across a connection 130. Connection 130 may be an analog connection that provides video to the computer 120, a digital connection that provides a network connection between the video camera 110 and the computer 120, or the connection 130 may include an analog connection and a digital connection.

System 100 may include one or more video cameras 110 wherein each video camera 110 connects to the computer 100 and a user interface 122 to provide a user connection to the computer 120. The one or more video cameras 110 may each connect via individual connections, may connect through a common network connection, or through any combination thereof.

System 100 includes at least one video analytics module 120. A video analytics module 140 may reside in the computer 120 and/or one or more of the video cameras 110. Video analytics module 140 performs video processing of the video. In particular, video analytics module 140 performs one or more algorithms to generate non-video data from video. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as a temporal properties of an object identified in two or more frame and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video.

Video analytics module 140 positioned in a camera 110 converts video to video data and non-video data and the camera 110 and provides the video data and the non-video data to the computer 120 over a network. As such, the system 100 distributes the video processing to the edge of the network thereby minimizing the amount of processing required to be performed by the computer 120.

Computer 120 may connect to an external system 150 that provides information related to the video. For example, external system 150 may include a POS system that provides POS transaction information to the computer. Computer 120 may include a POS module 190 that receives POS transaction information and converts the POS transaction information into events. For example, the POS module 190 may receive data descriptions of the content of the POS data. The POS module 190 generates events based on user defined behavior discussed hereinbelow.

Computer 120 includes computer-readable medium comprising software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network.

A user behavior is defined by an action, an inaction, a movement, a plurality of event occurrences, a temporal event, an externally-generated event or any combination thereof. A particular user behavior is defined and provided to the computer 120.

An action may include reaching for an object such as selecting a product from a retail shelf or retrieving an order ticket at a deli counter. An action may include picking up an object wherein the object has been placed or left at a particular location. An action may include moving a particular object such as the opening of a door, drawer or compartment. An action may include positioning (or repositioning) a body part such as placing a hand in a pocket after conducting retail transaction. The action may include moving to a particular position, a first individual engaging a second individual and/or moving a hand, arm, leg and/or foot in a particular motion. An action may also include positioning a head in a particular direction, such as, for example, looking directly at a manager's office or security camera 110. Other examples are discussed hereinbelow. Actions may also include motions that result in unsanitary conditions such as deli employees touching their faces during the process of filling deli orders.

Inaction may include failing to reach for an object wherein an object is dropped or positioned and the individual (e.g., object) does not retrieve the dropped object. Inaction may also include failing to perform a task that requires action, such as, for example, failing to offer a sales receipt, change or cash back requested by a customer during a debit transaction. Inaction may also include failing to place cash received from a customer into a register and/or cash slot. Inaction may also include failing to make an observation that requires movement of the body or head, such as, for example, looking under a shopping cart during a retail transaction. Inaction may also include failing to walk to a particular location or failure to perform a particular task. For example, confirming that a security door is locked would require the action of approaching the door and the action of striking the door to ensure that it would not open. As such, the user behavior may be defined as the inaction of approaching the door and/or the inaction of striking the door to confirm that the door will not open. In a health facility, an example of an inaction is failing to swipe a membership access card, indicative of a non-member entering the facility. An example of an inaction is a security guard failing to patrol assigned areas at specified intervals or at specified times.

A movement may include movement generated by an electronic system, such as, for example, advancing a portion of a customer receipt after a product is scanned or unwinding of a lottery ticket roll. Movement may also include the movement of items on a conveyor after a POS transaction.

A plurality of event occurrences may be a combination of related individual events. For example, a plurality of events may include events that require manager review or a plurality of events may include the removal of an object from a security case and a subsequent POS transaction or a POS transaction that does not include an item located in the security case.

A temporal event may include the identification of a customer that abruptly leaves a store, an individual dwelling at a store entrance or exit, an individual remaining in a particular location for an time period exceeding a threshold.

Externally-generated events may include transactions provided from a POS system, an environmental control system (e.g., heating, cooling and/or lighting) or any other system capable of generating and/or providing external events. Externally-generated events may be provided via any suitable connection, such as, for example, a hardwired connection and/or a network.

A user identifies a particular user behavior and provides and/or defines characteristics of the particular user behavior in the computer 120. Computer 120 receives non-video data from the camera 110 wherein the non-video data includes behavioral information data. The particular user behavior may be defined by a model of the behavior where the model includes one or more attribute such a size, shape, length, width, aspect ratio or any other suitable identifying or identifiable attribute. The computer 120 includes a matching algorithm 195, such as a comparator, that compares the defined characteristics and/or model of the particular user behavior with user behavior in the defined n the non-video data. Indication of a match by the matching algorithm 195 generates an investigation wherein the investigation includes the video data and non-video data identified by the matching algorithm 195. Matching algorithm 195 may be configured as an independent module or incorporated into the video analytics module 140 in the computer 120 or in any cameras 110.

A particular user behavior may be defined as the placement of a cashier's hand into a pocket within a preselected period after a POS transaction. This particular user behavior is indicative of a cashier failing to return the correct change to a customer and "pocketing" the difference. The video analytics module 140 performs an algorithm to generate non-video data that identifies the cashier, identifies the cashier's hand and the movement of the cashier's hand. The POS module 190 using data provided from the external system 150 (e.g., POS system) identifies an event that corresponds to the completion of a POS transaction and the matching algorithm 195 searches the non-video data within the predetermined period of time after the completion of the POS transaction to determine if the cashier's hand is placed in their pocket. A temporal match in a POS transaction and hand placement in a pocket results in the generation of an investigation.

Video analytics module 140 may include a comparator module configured to compare the model of the particular user behavior and the non-video data.

A particular user behavior may be defined as positioning a head toward an observation camera 110 exceeds a preset period or positioning of a head directly toward a manager's office exceeds a preset period. This particular user behavior is indicative of a customer trying to identify the observation cameras 100 in a store in an effort to prevent being detected during a theft or an employee trying to determine if a manager is observing their behavior. The video analytics module 140 performs an algorithm to generate non-video data that identifies the head position of objects. The video analytic module 140 may also provide a vector indicating the facial direction. The matching algorithm 140 searches the non-video data to determine if the head position and/or vector indicating facial direction exceeds the preset period. A match results in the generation of an investigation.

A particular user behavior may be defined as a cashier failing to provide a customer with cash back after a cash back debit card purchase (e.g., an inaction). A cash back debit transaction requires a cashier to perform two motions. The first motion is removing cash from the cash drawer and the second motion is providing the cash to the customer. Failing to complete the first and second motions after a cash back debit card transaction is indicative of a customer not receiving cash back from the transaction. The video analytics module 140 performs an algorithm to generate non-video data that identifies the cashier, identifies the cashier's hand and the movement of the cashier's hand. The POS module 190 identifies an event that corresponds to the completion of a cash back POS transaction and the matching algorithm 195 searches the non-video data within the predetermined period after the completion of the POS transaction to determine if the cashier's hand performed the first and second motions. A match results in the generation of an investigation.

Investigations are a collection of data related to an identified event. The investigation simply documents behaviors of interest. As such, investigations require further review and investigation to understand the particular behavior. Investigations may document customer preferences such as why a customer selected a particular item, how a customer shops for a particular item, and the amount of packaging detail a customer seeks before completing a selection. Other non-retail examples include how customers select a table in a restaurant, the amount of time a customer spends reading a particular advertisement or which movie poster attracts customers' interests while walking to a movie.

In some instances, investigations uncover criminal activity. For example, an investigation generated after identifying the user behavior of placing a cashier's hand into a pocket within a preselected period after a POS transaction includes a video sequence of the POS transaction. The investigation may also include a report of the POS transaction. A loss prevention individual is notified of the newly opened investigation and the investigation can be reviewed through any suitable user interface (e.g., computer, tablet PC, IPad, hand-held smart device or any other suitable device).

The loss prevention individual receives the investigation within seconds of the actual event. The video processing, POS transaction and processing, the matching algorithm 195 and generation of the investigation occur in near real time. As such, the investigation that includes all data and video required to view and assess the user behavior is electronically transmitted to the loss prevention individual's user interface.

An investigation generated after identifying the positioning of a head toward an observation camera 110 for a preset period or positioning of a head directly toward a manager's office for a preset period may include a plurality of video sequences related to the particular behavior. For example, an investigation is opened upon identification of the first occurrence of the user behavior. The investigation remains open and subsequent occurrences of behavior (e.g., the same and/or other related behavior) enters additional video sequences into the investigation. The loss prevention individual is notified of the open investigation and may observe the further investigation while the system 100 continues to populate the investigation with video sequences.

An investigation is populated with one or more video sequences of a particular individual that demonstrates a user behavior or the investigation is populated with video sequences of any individual that demonstrates the user behavior. For example, shrinkage may be a result of a single criminal or from a group of criminals working together. As such, the system 100 may be configured to populate the investigation with video from any individuals that exhibit similar behavior, or investigations may be opened for a group of individuals that enter the store together or make contact with each other in the store.

The system 100 provides the loss prevention individuals with tools, discussed hereinbelow, to amend and/or add to the contents of an investigation. For example, a loss prevention individual may add a video sequence or clip that clearly identifies the user's face, a video sequence that shows the individual entering the store and/or a video sequence that identifies additional criminal conduct. The loss prevention individual may also remove or amend a video sequence automatically entered into the investigation by the system 100.

An investigation may be connected to a particular employee. Employee may be indentified by an identification number, such as, for example, an identification number entered into the POS system. The investigation may remain open thereby forming an ongoing investigation that is populated with additional video sequences as behaviors of the particular employee are observed. For example, an employee may be the target of an ongoing internal investigation. As such, video sequences identified by the system are entered into the ongoing internal investigation related to this particular employee wherein POS data is used to identify the employee.

Figure 2:
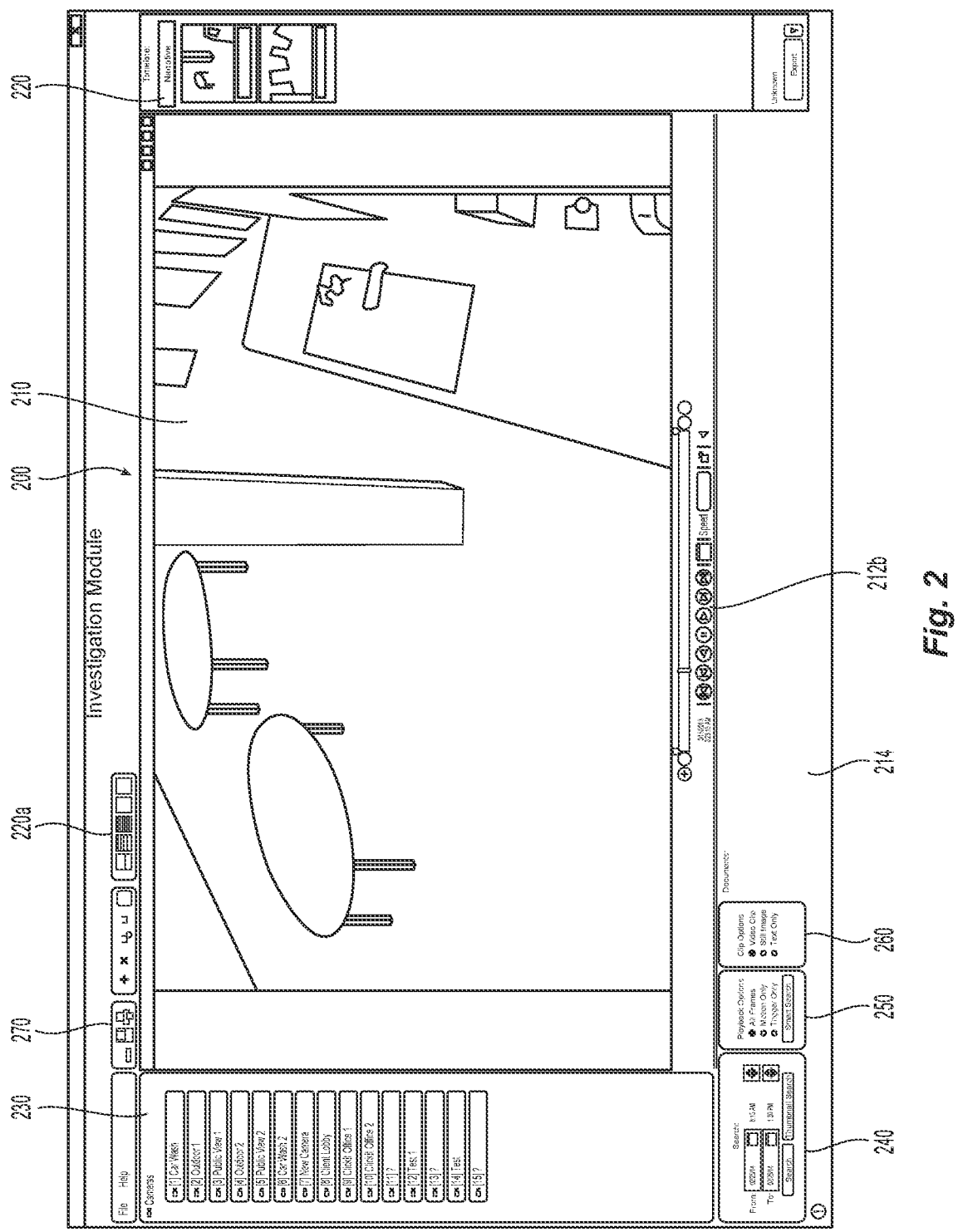
FIG. 2 is a screen-shot of an embodiment of an investigation module 200 displaying an investigation in accordance with the present disclosure.

FIG. 2 is a screen-shot of the investigation module 200 displaying an investigation generated in accordance of an embodiment of this disclosure. Investigation module 200 is configured to generate and store information required to document a particular user behavior.

Investigation module 200 includes a viewing window 210 with upper and lower viewing control bars 212a, 212b, a text entry window 214, a timeline window 220, a camera window 230, a search window 240, a playback option window 250, a clip option window 260 and a file maintenance window 270.

Investigations automatically generated by the system 100 are populated with information related to the particular user behavior as discussed hereinabove. For example, the investigation illustrated in FIG. 2 includes a first video sequence 220a and a second video sequence 220b wherein the first video sequence 220a is from the downstairs camera and the second video sequence 220b is from a camera located at the elevator. In one embodiment, the first video sequence 220a was provided through an automatically generated investigation and the automatically generated investigation was provided to the loss prevention individual.

The first video sequence 220a is selected in the timeline window 220 and played in the viewing window 210. To further this explanation and for example, suppose the loss prevention individual, upon viewing the first video sequence 220a on a PDA, observes an individual removing a company laptop computer from the downstairs area. In generating the investigation, the system identified this user behavior as a particular user behavior and upon review, the loss prevention individual concurs that the automatically generated investigation has merit and escalated the automatically generated investigation to a theft investigation.

Keep in mind, the automatically generated investigation was provided to the loss prevention individual in near real-time, therefore, the individual now in possession of the company laptop may have only taken a few steps from where the laptop was removed.

Using the PDA, the loss prevention individual furthers the automatically generated investigation (now a theft investigation) by observing temporally related video and video data available through the investigation module 200 on a PDA.

The search window 240 may automatically select a timeframe related to the investigation. The timeline may be manually controlled through the PDA.

Video and/or video data from one or more cameras listed in the camera window 230 may be selected for viewing in the viewing window 210. A plurality of video streams from individual cameras (see FIG. 1) may be viewed simultaneously by selecting an alternative viewing screen from the upper viewing control bar 212a.

The lower viewing control bar 212b allows viewing video in the viewing window 210 in real time or other selected speeds. The investigation module 200 provides an investigation playback speed wherein the playback speed is automatically calculated to replay video at a playback speed that requires the loss prevention individual to view every frame of the video sequence. Video is recorded and saved at speeds that exceed the ability of a human eye to detect slight movements. Additionally, the playback device may also have hardware and/or software limitations that prevent the playback device from displaying every frame of video. As such, playback of video at "real time" results in missing individual frames of video due to human viewing limitations and/or computer display limitations. The investigation playback speed is calculated based on the human viewing limitations and the display limitations of the particular device being used to view the investigation module 200.

Playback option window 250 allows the video sequence and/or the video from each camera to be played in various modes. The all frame display mode plays video at the calculated investigation playback speed wherein all frames are displayed and viewable during playback. The motion only display mode provides video sequences of the video that include motion. The trigger only display mode includes video sequences temporally related to a trigger.

Triggers include internal triggers and/or external triggers. Internal triggers include motion triggers defined by a user and determined by the video analytics module 140, POS triggers generated by the POS module 190 and analytics events defined by a tripline and/or a zone (e.g., entering and/or exiting a zone) and determined by the video analytics module 140. External triggers are generated by external hardware devices connected directly or indirectly to the computer 110.

At any point of the investigation the loss prevention individual may assign a video sequence to the timeline. For example, in FIG. 2 the loss prevention individual has added the second video sequence 220b to the investigation. The second video sequence 220b includes video provided from a camera positioned at the elevator and stairway. To further the scenario described hereinabove, suppose the loss prevention individual identified a suspect carrying the laptop and approaching an elevator displayed in the second video sequence 220b. In furtherance of the theft investigation, the loss prevention individual included the second video sequence 220b in the timeline of the investigation.

Loss prevention individual may select various options from the video clip window 260. The timeline window 220 may be populated with video clips including one or more video sequences, a still image generated from the video or text entered through the text entry window 214. A video clip may include a continuous video sequence. Alternatively, a video clip using the playback option of motion only (selected in the playback option window 250) includes a plurality of video sequences that include motion (e.g., non-motion portions of the video are excluded from the video clip). Finally, the loss prevention individual may capture a still image of a frame to capture an individual feature such as a facial image, a particular tool or object used during the theft, or any other significant image that may be required to further the investigation.

Finally, since the investigation is generated in near real-time, the loss prevention individual, upon confirmation of a theft currently in progress, is able to notify security and apprehend the thief before they are able to leave the premises.

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. A video analytics module, comprising:
    a memory storing user behavior type data indicating a plurality of types of user behaviors; and
    a processor configured to:
        receive video capture device data from a video capture device;
        identify user behavior from the video capture device data;
        receive point-of-sale data;
        identify at least one point-of-sale transaction from the point-of-sale data that corresponds to the user behavior;
        match the user behavior to at least one of the plurality of types of user behaviors, the user behavior that occur within a predetermined time window relative to completion of the at least one point-of-sale transaction; and
        generate investigation data based on identification of at least one point-of-sale transaction corresponding to the matched user behavior.

2. The video analytics module according to claim 1, wherein the memory further stores rule data including a plurality of rules associated with the plurality of types of user behaviors.

3. The video analytics module according to claim 1, wherein the plurality of types of user behaviors includes at least one of an action, an inaction, a movement, a plurality of event occurrences, a temporal event, or an externally-generated event.

4. The video analytics module according to claim 1, wherein the investigation data is generated concurrently with receipt of the video capture device data and the point-of-sale transaction.

5. The video analytics module according to claim 1, wherein the investigation data contains a video sequence including the user behavior.

6. The video analytics module according to claim 1, wherein the processor is further configured to transmit the investigation data over a network to a computing device.

7. The video analytics module according to claim 1, wherein the plurality of types of user behaviors includes an individual concealing at least one hand.

8. The video analytics module according to claim 1, wherein the plurality of types of user behaviors includes an individual positioning a head toward the video capture device for a predetermined time.

9. The video analytics module according to claim 1, wherein the video capture device data includes video data and non-video data.

10. A system for generating investigation data based on user behavior, the system comprising:
    a video capture device configured to capture video capture device data;
    a point-of-sale (POS) system configured to generate point-of-sale transaction information pertaining to at least one point-of-sale transaction;
    a computing device coupled to the video capture device and the POS system, the computing device including:
        a memory storing user behavior type data indicating a plurality of types of user behaviors; and
        a processor configured to:
            receive video capture device data from a video capture device;
            identify user behavior from the video capture device data;
            receive point-of-sale data;
            identify at least one point-of-sale transaction from the point-of-sale data that corresponds to the user behavior;
            match the user behavior to at least one of the plurality of types of user behaviors, the user behavior that occur within a predetermined time window relative to completion of the at least one point-of-sale transaction; and generate investigation data based on identification of at least one point-of-sale transaction corresponding to the matched user behavior.

11. The system according to claim 10, wherein the memory further stores rule data including a plurality of rules associated with the plurality of types of user behaviors.

12. The system according to claim 10, wherein the plurality of types of user behaviors includes at least one of an action, an inaction, a movement, a plurality of event occurrences, a temporal event, or an externally-generated event.

13. The system according to claim 10, wherein the investigation data is generated concurrently with receipt of the video capture device data and the point-of-sale transaction information.

14. The system according to claim 10, wherein the investigation data contains a video sequence including the user behavior.

15. The system according to claim 10, wherein the processor is further configured to transmit the investigation data over a network to a computing device.

16. The system according to claim 10, wherein the plurality of types of user behaviors includes an individual concealing at least one hand.

17. The system according to claim 10, wherein the plurality of types of user behaviors includes an individual positioning a head toward the video capture device for a predetermined time.

18. The system according to claim 10, wherein the video capture device data includes video data and non-video data.

\* \* \* \* \*